United States Patent
Johnson

(10) Patent No.: US 8,983,537 B2
(45) Date of Patent: Mar. 17, 2015

(54) OBJECT LOCATOR SYSTEM AND METHOD

(76) Inventor: Glenn Johnson, Palm City, FL (US)

( * ) Notice: Subject to any disclaimer, the term of this patent is extended or adjusted under 35 U.S.C. 154(b) by 0 days.

(21) Appl. No.: 13/462,418

(22) Filed: May 2, 2012

(65) Prior Publication Data

US 2012/0214545 A1    Aug. 23, 2012

Related U.S. Application Data

(63) Continuation-in-part of application No. 12/650,237, filed on Dec. 30, 2009, now Pat. No. 8,254,958.

(51) Int. Cl.
| | |
|---|---|
| *H04M 1/00* | (2006.01) |
| *G08B 21/24* | (2006.01) |
| *H04M 1/215* | (2006.01) |
| *G08B 25/00* | (2006.01) |
| *G08B 25/10* | (2006.01) |

(52) U.S. Cl.
CPC .............. *G08B 21/24* (2013.01); *G08B 25/009* (2013.01); *G08B 25/10* (2013.01); *H04M 1/2155* (2013.01)
USPC ................... 455/556.1; 455/556.2; 455/550.1; 455/456.3; 340/539.32; 340/539.1

(58) Field of Classification Search
CPC .. G08B 25/10; G08B 25/009; G06Q 30/0257; G06Q 30/0261; H04W 12/04; H04W 12/06; H04W 4/005; H04W 4/02; H04W 4/04; H04W 4/043; H04M 3/5141
USPC .......... 455/556.1, 556.2, 550.1, 456.3, 456.1, 455/418, 411, 466, 517; 340/539.32, 539.1, 340/539.11, 539.13
See application file for complete search history.

(56) References Cited

U.S. PATENT DOCUMENTS

| | | | |
|---|---|---|---|
| 4,476,469 A | 10/1984 | Lander | |
| 6,147,602 A | 11/2000 | Bender | |
| 6,297,737 B1 * | 10/2001 | Irvin | 340/571 |
| 6,501,378 B1 | 12/2002 | Knaven | |
| 6,624,752 B2 | 9/2003 | Klitsgaard et al. | |
| 6,774,787 B1 * | 8/2004 | Melbourne | 340/539.1 |
| 7,034,684 B2 * | 4/2006 | Boman et al. | 340/568.1 |
| 7,205,894 B1 | 4/2007 | Savage | |
| 7,271,715 B2 | 9/2007 | Aupperle et al. | |
| 7,274,292 B2 | 9/2007 | Velhal et al. | |
| 7,375,632 B1 | 5/2008 | Sebanc | |
| 7,394,362 B2 | 7/2008 | Ogino et al. | |

(Continued)

FOREIGN PATENT DOCUMENTS

JP    2008052355    3/2008

*Primary Examiner* — Khai M Nguyen
(74) *Attorney, Agent, or Firm* — Akerman LLP

(57) ABSTRACT

A locating system and method for locating objects, such as keys, is disclosed. The locating system may include a transmitter for transmitting an encrypted code in the 900 MHz band. The transmitter may be powered by a battery. By transmitting in the 900 MHz band, the battery power consumed by the transmission may be relatively low and the encrypted code may travel a relatively long distance, such as 100 feet or more. The locating system may include a battery-powered locator device that is configured to detect, receive, and/or decode the encrypted code and determine whether the encrypted code is associated with the locator device or an attached object. After which, the locator device may provide an indication of its position. For instance, an audible sound of 85 dB or greater may be generated. The transmitter may be a self-contained device, or affixed onto or incorporated into a communications device.

15 Claims, 2 Drawing Sheets

(56) References Cited

U.S. PATENT DOCUMENTS

| | | |
|---|---|---|
| 7,420,465 B2 | 9/2008 | Ritter |
| 7,423,528 B2 * | 9/2008 | Otto ........................ 340/539.17 |
| 7,423,580 B2 | 9/2008 | Markhovsky et al. |
| 7,453,357 B2 * | 11/2008 | Bernal-Silva et al. ... 340/539.32 |
| 7,518,515 B2 | 4/2009 | Trosper |
| 8,253,560 B2 * | 8/2012 | Howard et al. .......... 340/539.32 |
| 2003/0034887 A1 * | 2/2003 | Crabtree et al. .............. 340/539 |
| 2003/0120745 A1 | 6/2003 | Katagishi et al. |
| 2003/0122671 A1 | 7/2003 | Jespersen |
| 2004/0023697 A1 | 2/2004 | Komura |
| 2004/0178908 A1 | 9/2004 | Sari et al. |
| 2005/0148341 A1 | 7/2005 | Chang |
| 2005/0186968 A1 | 8/2005 | Durst et al. |
| 2006/0022038 A1 | 2/2006 | Hewlin et al. |
| 2006/0202840 A1 * | 9/2006 | Korbonski ................. 340/573.4 |
| 2007/0030147 A1 | 2/2007 | Hamolsky |
| 2007/0030164 A1 | 2/2007 | Lim |
| 2007/0052534 A1 | 3/2007 | Bird et al. |
| 2007/0087596 A1 | 4/2007 | Chung et al. |
| 2007/0194923 A1 | 8/2007 | Karr |
| 2007/0222592 A1 | 9/2007 | Zelman |
| 2007/0236347 A1 | 10/2007 | Francois et al. |
| 2008/0062120 A1 | 3/2008 | Wheeler et al. |
| 2008/0088441 A1 | 4/2008 | Breed |
| 2008/0102859 A1 * | 5/2008 | Karr et al. .................. 455/456.3 |
| 2008/0238663 A1 | 10/2008 | Saito et al. |
| 2009/0012952 A1 | 1/2009 | Fredriksson |
| 2009/0264082 A1 * | 10/2009 | Tieman et al. ................. 455/73 |
| 2010/0277287 A1 * | 11/2010 | Choi et al. ................. 340/10.42 |

* cited by examiner

OBJECT LOCATOR SYSTEM AND METHOD

CROSS-REFERENCE TO RELATED APPLICATION

This patent application is a continuation-in-part of U.S. patent application Ser. No. 12/650,237, entitled Audible Key Locator System and filed Dec. 30, 2009, the entirety of which is incorporated by reference herein in its entirety.

FIELD OF THE INVENTION

This invention is directed generally to systems configured to locate keys and other objects using a mobile device, and more particularly to systems configured to locate keys and other objects using a cellular telephone or other transmitter.

BACKGROUND

Since the advent of keys and their use as a way of securing entry into dwellings, starting of vehicles, and other such uses, there has existed a need for preventing the loss of keys and providing a method of locating keys. In the past, electronic devices have been created that enable users to identify the location of keys, such as a key ring containing keys. Many of these systems are formed from a self-contained activation device and a self-contained sounds generating device. In such systems the location of the self-contained activation device must always be known, otherwise, the effectiveness of the system is eliminated. For example, if the location of the self-contained activation device is not known, then a user will have to search out the location of the self-contained activation device. Once the self-contained activation device is located, then the keys may be located. Such process, in essence, is no different from having to search out the location of the keys. Thus, these systems do not create a more failsafe system. Rather, these systems merely create more complexity. Thus, there exists a need for a more efficient system for locating keys and other such items.

SUMMARY OF THE INVENTION

This invention relates to a locating system for locating objects, such as, but not limited to, key rings or key fobs. The locating system may be formed from a mobile communication device having at least one audible tone generator in communication with a control module. The mobile communication device may be, but is not limited to, a cellular or satellite phone. The control module may be configured to send a signal to the audible tone generator to emit an audible tone. Upon activation, such as, but not limited to, depressing a key on the keypad, the mobile communication device emits an audible tone that is received by a locator device. The locator device may be physically detached from the mobile communication device. The locator device may emit an audible tone so that someone may locate the item to which the locator device is attached. The locator device may include a receiver configured to receive the audible signal from the audible tone generator and to generate a signal and may include a second audible tone generator configured to receive the signal from the receiver and create an audible sound.

The locating system may include a number of different embodiments. In particular, in one embodiment, the audible tone generator may produce an audible tone that may be a single pitch ring tone. In another embodiment, the audible tone generated by the audible tone generator may be a ring tone that has been previously downloaded to the mobile communication device.

In yet another embodiment, the locating system may be configured such that the control module is configured to send a signal to the audible tone generator to emit an audible tone after detecting an inoperable sequence of tones that match a tone sequence corresponding to the locator device. The mobile communication device may be configured to receive input of a sequence and to transmit that sequence to the locator device using the at least one audible tone generator. The inoperable sequence of tones is a series of tones that does not function to compete a phone call. The control module may be configured to send a signal to the audible tone generator of the mobile communication device to emit an audible tone after detecting an inoperable sequence of tones that is four or more, but less than seven, distinct tones that match a tone sequence corresponding to the locator device. In another embodiment, the control module may be configured to send a signal to the audible tone generator to emit an audible tone after detecting an inoperable sequence of tones that is five distinct tones that match the tone sequence corresponding to the locator device. In yet another embodiment, the control module may be configured to send a signal to the audible tone generator to emit an audible tone after detecting an inoperable sequence of tones that is six distinct tones that match the tone sequence corresponding to the locator device.

In an alternative embodiment, the audible tone generator may be configured to emit a high-pitched audible tone that is incapable of being heard by an unaided human ear. In such embodiment, the receiver in the locator device may be configured to receive the audible signal from the audible tone generator and to generate a signal to the second audible tone generator to generate an audible tone. The mobile communication device may also include a radio frequency generator that generates a radio frequency when a call send is activated, wherein the radio frequency is an audible tone that is incapable of being heard by an unaided human ear.

The locating system may also include a method of locating a key ring that includes activating a mobile communication device having at least one audible tone generator in communication with a control module, wherein the control module sends a signal to the audible tone generator to emit an audible tone. The method may include sending a signal from the control module to the audible tone generator, thereby emitting an audible tone from the audible tone generator and receiving the audible tone in a receiver configured to receive the audible signal from the audible tone generator and to generate a signal, wherein the receiver is positioned in a locator device physically detached from the mobile communication device. The method may also include generating an audible sound in a second audible tone generator configured to receive the signal from the receiver and create an audible sound, wherein the second audible tone generator is contained within the locator device.

The step of activating a mobile communication device and sending a signal from the control module to the audible tone generator, thereby emitting an audible tone is repeated multiple times to form a sequence. In another embodiment, the step of activating a mobile communication device and sending a signal from the control module to the audible tone generator, thereby emitting an audible tone is repeated four or more but less than seven times to form a sequence. In yet another embodiment, the step of activating a mobile communication device and sending a signal from the control module to the audible tone generator, thereby emitting an audible tone is repeated five or six times to form a sequence. An additional step includes comparing the sequence to a stored sequence and if the sequences match, generating an audible sound using the second audible tone generator in the locator device.

The method may be further defined such that emitting an audible tone from the audible tone generator may include emitting a single pitch ring tone. The method may also be further defined such that emitting an audible tone from the audible tone generator comprises emitting a ring tone that has been previously downloaded to the mobile communication device. In another embodiment, the step of emitting an audible tone from the audible tone generator may include emitting a high-pitched audible tone that is incapable of being heard by an unaided human ear.

An advantage of this invention is that the locating system may be used to effectively locate keys, such as, but not limited to, car keys, house keys, or key fobs, with little trouble.

Another advantage of this invention is that the locating system combines the a device to located keys with a mobile communications device that is an everyday part of many peoples' lives, thereby acting to add an additional feature without increasing the number of devices that the user needs to keep track of throughout the day.

A locating system and method for locating objects, such as, but not limited to, keys or key fobs is disclosed. The locating system may include a transmitter for transmitting an encrypted code in the 900 MHz band. The transmitter may be powered by a battery. As a result of transmitting in the 900 MHz band, the battery power consumed by the transmission may be relatively low and the encrypted code may travel a relatively long distance, such as up to approximately 100 feet or more. The locating system may include a battery-powered locator device that is configured to detect, receive, and/or decode the encrypted code and determine whether the encrypted code is associated with the locator device or an object attached to the locator device. After which, the locator device may provide an audio, visual, or other indication of its position. In one aspect, the locator device may provide an audio indication that may be heard from a relatively long distance, and may have an decibel level of approximately 85 dB or more. The transmitter may be a self-contained device, such as in the form of a chip, SIM card, or credit card, or affixed onto or incorporated into another device, such as a hand-held communications device.

In one aspect, a locating system for locating an object may be provided. The locating system may include a transmitter configured to transmit an encrypted code associated with or corresponding to a locator device and/or the object. The transmitter may transmit the encrypted code in the 900 MHz band, and the transmitter may be powered by a first dedicated battery. The locating system may also include the locator device that is attached to the object. The locator device may have a receiver, a processor, and/or an indicator. The receiver may be configured to receive and/or detect the encrypted code transmitted in the 900 MHz band corresponding to the locator device and/or object. Then the locator device—such as via the processor, receiver, and/or other components—may decode the encrypted code and determine/verify whether the encrypted code is associated with the locator device and/or object. The locator device may be powered by a second dedicated battery. Upon receipt of the encrypted code by the receiver and a determination or verification that the encrypted code is associated with the locator device and/or object by the locator device, the indicator on the locator device may provide an indication as to a location of the locator device and object.

In another aspect, the locating system may include a handheld communications device configured to transmit both in a scrambled mode for voice communications and an encrypted mode for transmitting a unique encrypted code associated with a locator device and/or an inanimate object, either simultaneously or sequentially/individually. The locating system may include the locator device, and the locator device may be attached to the inanimate object. The locator device may have a receiver, a processor, and/or an indicator. The receiver may be configured to detect the unique encrypted code. The receiver, processor, and/or other components of the locator device may then decode the encrypted code and determine whether the unique encrypted code detected is associated with or corresponds to the locator device and/or inanimate object. As a result, when the hand-held communications device transmits the unique encrypted code in a 900 MHz band, the unique encrypted code may travel at least approximately 100 feet or more, and upon detection of the unique encrypted code by the receiver and verification that the unique encrypted code is associated with the locator device and/or inanimate object, the indicator of the locator device may provide an indication of a location of the locator device and inanimate object.

In another aspect, a method of using a locating system to locate an inanimate object may be provided. The method may include receiving an encrypted code in the 900 MHz band via a receiver located on a locator device; decoding the encrypted code in the 900 MHz band and then determining whether the encrypted code in the 900 MHz band corresponds to a code identifying the locator device and/or an inanimate object attached to the locator device via the receiver or another component located on the locator device, such as a processor; and providing an indication of a location of the locator device and/or inanimate object via the locator device when the encrypted code in the 900 MHz band corresponds to the code identifying the locator device and/or inanimate object. The indication of the location of the locator device and/or inanimate object may be provided by a speaker or other indicator located on the locator device and that provides an audible sound at approximately 85 dB, approximately 90 dB, approximately 95 dB or greater. The method may include transmitting the encrypted code in the 900 MHz band such that the encrypted code detectably travels at least approximately 100 feet or more.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
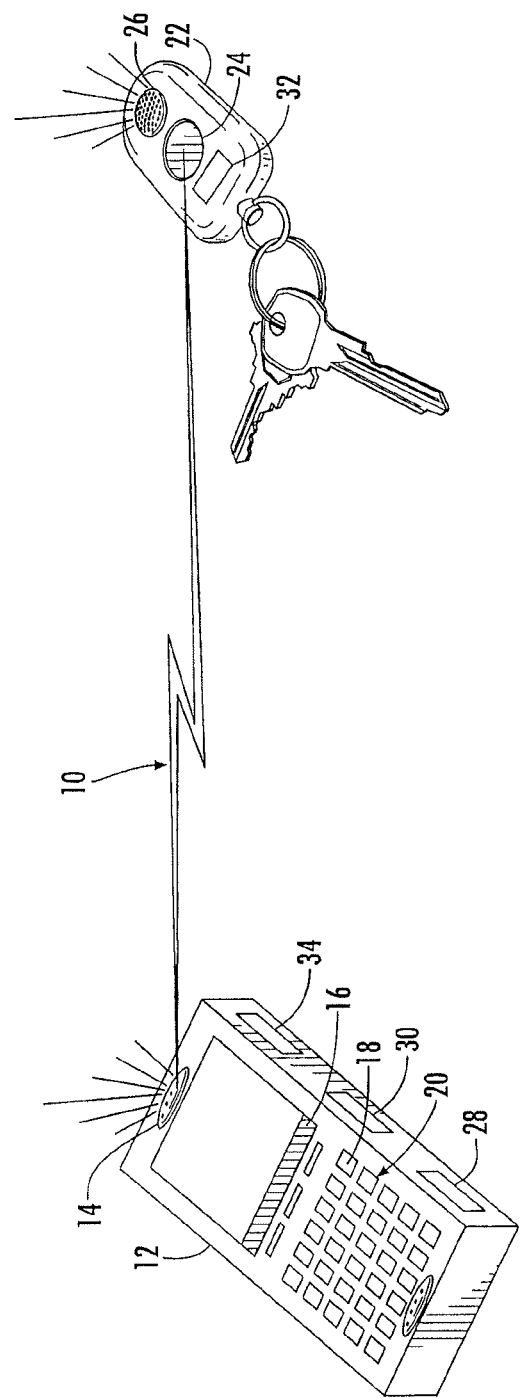
FIG. 1 is a perspective view of an exemplary locating system.

As shown in FIG. 1, this invention is directed to a locating system 10 for locating objects, such as, but not limited to, key rings. The locating system 10 may be formed from a mobile communication device 12 having at least one audible tone generator 14 in communication with a control module 16. The mobile communication device 12 may be, but is not limited to, a cellular or satellite phone. The control module 16 may be configured to send a signal to the audible tone generator 14 to emit an audible tone. Upon activation, such as, but not limited to, depressing a key 18 on the keypad 20, the mobile communication device 12 emits an audible tone that is received by a locator device 22. The keypad 20 may be a physical keypad, an electronic keypad contained on a screen or any other appropriate input device. The locator device 22 may be physically detached from the mobile communication device 12. The locator device 22 may emit an audible tone so that a user may locate the item to which the locator device 22 is attached. The locator device 22 may include a receiver 24 configured to receive the audible signal from the audible tone generator 14 and to generate a signal and may include a second audible tone generator 26 configured to receive the signal from the receiver 24 and create an audible sound.

The locating system 10 may be formed in a number of different embodiments. The mobile communication device 12 may have any appropriate configuration for a communications device. The mobile communication device 12 may be any mobile communication device, such as, but not limited to, a cellular telephone, a satellite telephone or other handheld communications device.

The locator device 22 may be physically detached from the mobile communication device. The locator device 22 may include a connection device enabling the locator device to be attached to one or more keys, a key ring, or any other appropriate device. The locator device 22 may have any appropriate configuration, and, in at least one embodiment, may be configured as small as possible yet retain sufficient durability. The locator device 22 may be configured to house a receiver 24 and a second audible tone generator 26. The receiver 24 and a second audible tone generator 26 may have any appropriate configuration.

The audible tone generator 14 in the mobile communication device 12 may be configured to emit a single pitch ring tone. In at least one embodiment, the audible tone generated by the audible tone generator 14 may be a ring tone that has been previously downloaded to the mobile communication device 12.

In another embodiment, the control module 16 may be configured to send a signal to the audible tone generator to emit an audible tone after detecting an inoperable sequence of tones that match a tone sequence corresponding to the locator device 22. Specifically, the control module 16 may be configured to send a signal to the audible tone generator 14 of the mobile communication device 10 to emit an audible tone after detecting an inoperable sequence of tones that is four or more, but less than seven, distinct tones that match a tone sequence corresponding to the locator device 22. In one embodiment, the control module 16 may be configured to send a signal to the audible tone generator 14 to emit an audible tone after detecting an inoperable sequence of tones that is five or six distinct tones that match the tone sequence corresponding to the locator device 22. The receiver 24 in the locator device 22 may be configured to receive input of a sequence and may be configured to transmit that sequence to the locator device 22 using the audible tone generator 14 of the mobile communication device 12.

In an alternative embodiment, the system 10 may also be configured such that the audible tone generator 14 is configured to emit a high-pitched audible tone that is incapable of being heard by an unaided human ear. The receiver 24 in the locator device 22 may be configured to receive the audible signal from the audible tone generator 14 and to generate a signal that is sent to the second audible tone generator 26 to generate an audible tone so that a user can locate an item to which the locator device 22 is attached.

The locating system 10 may also include a radio frequency generator 28 that generates a radio frequency when the mobile communication device 12 is activated to locate the locator device 22. In at least one embodiment, the radio frequency generator 28 may be activated when a call is sent. The radio frequency generator 28 may generate an audible tone that is incapable of being heard by an unaided human ear.

The radio frequency may be generated after a user dials a phone number associated with the locator device 22. The cell phone number may be unique to the locator device 22, which may serve to locate lost keys or other items by placing a call to a unique phone number using a cell phone or other device capable of placing a phone call. The cellular signal may be sent a tower or other appropriate structure into the mobile telephone network. The signal may be sent to the locator device 22, which may include a receiver configured to process a mobile telephone signal but not make a telephone call.

In another embodiment, the mobile communication device 12 may be a cell phone. The cell phone 12 may be configured such that the cell phone 12 generates an unscrambled signal. The unscrambled signal may be generated by the cell phone 12, such as by a unscrambled signal generator 34, or by a transceiver either attached to the phone or included within the phone. The cell phone 12 may send an unscrambled signal when the call send key is depressed. The unscrambled signal may be sent using the cell phone in the typical strength. As such, the unscrambled signal may be able to reach the locator device 22 at a long distance. The locator device 22 may be configured to emit an audible sound upon receiving the unscrambled signal.

In another embodiment, a transceiver 30 may be coupled to a mobile communication device 12, such as, but not limited to, a cell phone. In at least one embodiment, the transceiver 30 may be a thin, generally planar device, such as about ⅟₃₂ of an inch in thickness. The transceiver 30 may be coupled to an outer surface of a mobile communication device 12 such that the transceiver 30 may be releasably coupled to an outer surface of the mobile communication device 12. The transceiver 30 may receive a unique frequency signature either created at random or created by the conversion of tones from the cell phone keys that are converted to an RF signal. In either example, a signal may be sent from the transceiver 30 to the a received in the locator device 22. In one embodiment, the signal emitted may be, but is not limited to being, a 900 MHz signal. In such embodiment, the mobile communication device 12 generates tones when keys are pressed, and the tones are transmitted by the transceiver 30. Using the tones on the keyboard of the mobile communications device 12, an infinite number of receivers coupled be used. The transceiver 30 may also be configured such that the transceiver 30 may be set to recognize a particular sound or series of sounds and transmit a signal upon receiving that particular sound in the future. As such, the transceiver 30 may be used to control an infinite number of locator devices 22, each locator device 22 associated with a different sound or series of sounds. An audible sound could be emitted from the locator device 22 to assist a person in finding keys attached to the locator device 22.

In yet another embodiment, the locator device 22 could include a GPS module 32 (global positioning system) that could be configured to send a GPS signal including the coordinates of the location of the locator device 22 if the locator device 22 were activated. The locator device 22 could also emit an audible signal so that a user could more easily locate the keys and locator device 22 when near the keys. The locator device 22 may be activated using any of the systems and methods described herein. The GPS coordinates may be sent to the mobile communication device 12. The mobile communication device 12 may include a GPS receiver and be configured to display the GPS coordinates and possibly a map with the location of the mobile communication device 12 and the location of the locator device 22.

The locator system 10 may be used to locate any object to which the locator device 22 is attached. In particular, the locator system 10 may include a method of locating a key ring that includes activating the mobile communication device 12 having at least one audible tone generator 14 in communication with the control module 16. The control module may send a signal to the audible tone generator 14 to emit an audible tone. The locator system 10 may send a signal from the control module 16 to the audible tone generator 14, thereby emitting an audible tone from the audible tone generator 14. The method may include receiving the audible tone in the receiver 24 that is configured to receive the audible signal from the audible tone generator 14 and to generate a signal, wherein the receiver 24 is positioned in the locator device 22 physically detached from the mobile communication device 12. The method also includes generating an audible sound in the second audible tone generator 26 that is configured to receive the signal from the receiver 24 and create an audible sound, wherein the second audible tone generator 26 may be contained within the locator device 22.

In one embodiment, the step of activating a mobile communication device 12 and sending a signal from the control module 16 to the audible tone generator 14, thereby emitting an audible tone is repeated multiple times to form a sequence. The sequence may be compared with a stored sequence and if the sequences match, the second audible tone generator 14 in the locator device 22 generates an audible sound. The step of activating a mobile communication device 12 and sending a signal from the control module 16 to the audible tone generator 14, thereby emitting an audible tone may be repeated four or more but less than seven times to form a sequence. In another embodiment, the step of activating a mobile communication device 12 and sending a signal from the control module 16 to the audible tone generator 14, thereby emitting an audible tone may be repeated five or six times to form a sequence. If the sequences match, an audible sound may be generated using the second audible tone generator 26 in the locator device 22.

The step of emitting an audible tone from the audible tone generator 14 may include emitting a single pitch ring tone. In another embodiment, the step of emitting an audible tone from the audible tone generator 14 may include emitting a ring tone that has been previously downloaded to the mobile communication device 12. In yet another embodiment, the step of emitting an audible tone from the audible tone generator 14 may include emitting a high-pitched audible tone that is incapable of being heard by an unaided human ear.

In another embodiment, the method of locating a key ring includes inputting a sequence of characters into a mobile communication device 12 and activating the mobile communication device 12 having at least one radio frequency generator for generating at least one radio signal. The method also includes sending the at least one radio signal from the at least one radio frequency generator 28 in the mobile communication device 12 upon activating the mobile communication device 12 to send a call and receiving the at least one radio signal in a receiver 24 in a locator device 22 that is physically detached from the mobile communication device 12. The sequence may be compared to a stored sequence and if the sequences match, an audible sound may be generated in an audible tone generator 14 configured to receive the signal from the receiver 24 and create an audible sound, wherein the audible tone generator 14 is contained within the locator device.

I. Additional Developmental Efforts

Conventional key finders may exhibit certain drawbacks, such as high cost, being effective only for short distances, high battery consumption, and various other hurdles. The inventor's developmental efforts have resulted in embodiments having a key finder associated with a cell phone, and making the transmitter very small such that a user may alternatively use the transmitter as a self-contained device that is carried around by itself, such as in a wallet or purse.

Some of the developmental efforts included looking into how garage door openers work and how key fobs wirelessly open a vehicle. The practicability of having a transmitter operate in the ISM (Industrial, Science and Medical) 400 MHz band was investigated. However, the ideas of having the transmitter imbedded in the cell phone, or be small enough to affix to a cell phone or put in a wallet require that the transmitter be very small or miniaturized so as not to be impractical. The 400 MHz band was found to be unacceptable.

The investigation revealed that an object finder system should use a RF transmission, and that this transmission be in the ISM 900 MHz band. If the transmitter was shifted to the ISM 900 MHz range or band, a number advantages would exist for a key or object finder system. It is believed that using the ISM 900 MHz band for a key or object finder is unique and advantageous because of, among other things, the following: (1) if a key finder transmitter happens to be imbedded in a cell phone, it may be beneficial to use a separate transmitter in the cell phone, such as one miming in the 900 MHz band instead of the cell phone band that is used for cellular transmission; (2) both the transmitter and receiver could be miniaturized and still be effective because the size of the antenna could be much smaller; (3) since a natural antenna (i.e., a copper wire of a specific length) could be used instead of a manufactured antenna, cost savings and/or performance gains may be realized; and (4) battery consumption may be less or much less than existing devices because in the ISM 900 range, the differentiator in the receiver may not be as bombarded by other signals.

It is believed that an object finder system having a transmitter and receiver that operate in the 900 MHz range may be the smallest, and the most effective and efficient. On the other hand, conventional devices may be relatively bulky, have short distance of transmission (30 feet instead of 120 feet for some of the disclosed embodiments), and may consume battery life rapidly.

In sum, the inventor set out to make the most miniature transmitter and receiver on the market that would use the least amount of electricity, enabling the smallest size, and the least cost to manufacture. The benefits of miniaturization and power consumption and cost may be many: (1) the transmitter may be small enough to affix to the back of a cell phone, other mobile device, or wallet with the least inconvenience; (2) the transmitter may be built into the circuitry of a cell phone or mobile device, and take up the least amount of space and power consumption (the cost may be very minimal to add the transmitter to a mobile device. Existing Bluetooth and Wi-Fi transmissions may require too much power consumption both on the transmitter and receiver. A Bluetooth transmission may have a search limit of approximately 30 feet, and may require enough energy in the receiver to require the user to replace batteries often. Wi-Fi transmissions may have issues related to miniaturization and power consumption that are not favorable to the user. On the other hand, the present embodiments may create a separate radio frequency transmission in the 900 MHz range); (3) a receiver in the 900 MHz band may use less battery consumption because the band is wide enough that the receiver may discriminate less; (4) a natural antenna (copper wire of specific length) in the 900 MHz band may be shorter, less expensive, and consume less power than other useful bands' antennas; (5) an object finding system in the 900 MHz band may be established as the default "Norm" for object finding, such as Bluetooth is used for other functions (key or object finders may be manufactured to operate in a selected frequency, or multiple frequencies in the 900 MHz band. Therefore a standard may be set for a system that is compatible with others. If someone provides the code and specific frequency of their object to find, then another may find it with the transmitter of the present embodiments); (6) if using a cell phone, trying to utilize the raw cell transmission to find objects may require expensive descrambling on the receiver side (having a separate band in the 900 MHz range may simplify the process. The 900 MHz range may be a license free band and have a strong range for finding objects); (7) the receiver in the 900 MHz band may be leveraged to "bridge" with other products, using a different frequency band (a 900 MHz system receiver may have a power jack drawing power that is being sent to the sound buzzer upon activation, and this jack may be used to connect to garage door openers and car remote control key fobs—systems that would otherwise have limited use because they are operating in an inferior frequency band with regards to size and power consumption); and (8) this 900 MHz band, by becoming a standard due to superiority, may now be leveraged by allowing the receiver to be miniaturized enough to be affixed to a pair of reading glasses, or other object requiring an even smaller receiver size, by simply giving the transmitter sufficient power (AC power or a cell phone battery supplying much greater power than small coin batteries).

II. Exemplary Frequency Band Embodiments

A number of exemplary frequency band embodiments are disclosed herein. In one aspect, a locating system for locating an object may be provided. The locating system may include a transmitter configured to transmit an encrypted code associated with or corresponding to a locator device and/or the object. The transmitter may transmit the encrypted code in the 900 MHz band, and the transmitter may be powered by a first dedicated battery. The locating system may also include the locator device. The locator device may be attached to the object. The locator device may have a receiver and an indicator. The receiver may be configured to receive and/or detect the encrypted code transmitted in the 900 MHz band and that corresponds to or identifies the locator device and/or object. After receipt of the encrypted code, the receiver or other component of the locator device, such as a CPU or processing unit, may then decode the encrypted code and determine whether the encrypted code is associated with or corresponds to the locator device and/or object. The locator device and its components, such as a receiver, processor, and/or indicator, may be powered by a second dedicated battery. Upon receipt of the encrypted code by the receiver and a determination or verification that the encrypted code is associated with the locator device and/or object, the indicator of the locator device may provide an indication as to a location of the locator device and/or object.

The effective range that the transmitter may trigger the indicator on the locator device into indicating a location of the locator device and/or object may be approximately 100 feet, approximately 110 feet, approximately 120 feet, approximately 125 feet, approximately 130 feet, approximately 140 feet, or more. In other words, the receiver on the locator device may be able to detect and/or receive the encrypted code transmitted by the transmitter at ranges of 100 feet, 110 feet, 120 feet, 125 feet, 130 feet, 140 feet, or more.

The transmitter of the locator device may be capable of transmitting a transmission capable of being received through walls, drawers, and other impediments. The transmitter may be able to trigger the indicator on the locator device even if a line of sight between the transmitter and the locator device is blocked, such as being blocked by one or more walls of a house. The transmitter may have an antenna, such as a natural antenna, that is wrapped around at least a portion of the circumference of a flat device, chip, or card on which the transmitter located. Such wrapping and/or placement of the antenna may reduce interference produced by other components on the flat device, chip, or card and enhance the effective range of the transmission.

The transmitter may be a self-contained device, and may be located upon a flat device or card of not more than approximately 2 or 3 inches in length and/or height, with minimal thickness. For instance, the transmitter may be located upon a flat surface having a surface area smaller than approximately 3.0 inches×approximately 3.0 inches, approximately 2.0 inches×approximately 2.0 inches, approximately 1.0 inch× approximately 1.0 inch, approximately 0.5 inches×approximately 0.5 inches, approximately 0.25 inches×approximately 0.25 inches, or other surface areas. The surface area of the flat surface may be less than approximately 5.0 square inches, 3.0 square inches, 2.0 square inches, 1.0 square inch, 0.5 square inches, or other areas. The thickness may be less than approximately 0.25 inches, 0.10 inches, or other small widths. Alternatively, the transmitter may be attached to an exterior of, or located within an interior, of a hand-held communications device, and may transmit upon user activation of a button or icon, such as an icon within a user interface of the hand-held communications device.

The indication as to the location of the locator device and/or object may be an audible sound. A decibel level of the audible sound may be loud enough to be heard by an human ear at a range of approximately 20 feet, approximately 30 feet, approximately 40 feet, approximately 50 feet, or more. The decibel level of the audible sound generated may be at least approximately 80 dB, approximately 85 dB, approximately 90 dB, approximately 95 dB, or more. The audible sound may be generated by a speaker or other sound producing means located on the locator device.

In one embodiment, the receiver and/or locator device may be configured to normally operate in sleep mode to conserve power of a battery powering a receiver, a processor, an indicator, and/or other components located on the locator device. Upon detection of a signal being transmitting in the 900 MHz band, such as between approximately 900 MHz and approximately 950 MHz, the receiver and/or processor may "wake-up" and determine whether the transmission being received includes an encrypted code that corresponds to a unique code that identifies the locator device and/or object. If so, the locator device and/or indicator may provide an indication as to its location. Other configurations may be used.

The hand-held communications device may be configured to switch from a scrambled voice communications mode in a 800 MHz band to an encrypted code mode in which the encrypted code is transmitted in the 900 MHz band. The 900 MHz band may be between approximately 900 MHz and approximately 950 MHz, or other bands, including those discussed elsewhere herein.

In another aspect, the locating system may include a hand-held communications device configured to transmit in both a scrambled mode for voice communications and an encrypted mode for transmitting a unique encrypted code associated with an inanimate object, either simultaneously or one at a time. The locating system may include a locator device located on or attached to the inanimate object, and the locator device may include a receiver and an indicator, and other components, such as a controller or processor. The receiver may be configured to detect the unique encrypted code, and then the receiver or controller may determine whether the unique encrypted code detected is associated with, or corresponds to, the locator device and/or inanimate object.

The hand-held communications device may have a single transmitter and/or antenna and switch from the scrambled mode to the encrypted mode upon activation of a button or icon, and then transmit the unique digital or encrypted code in a 900 MHz band such that the unique encrypted code travels approximately 100 feet or more. Alternatively, the hand-held communications device may have a first dedicated transmitter and antenna pair configured to transmit in the scrambled mode for voice communications and a second dedicated transmitter and antenna pair configured to transmit the unique encrypted code associated with an inanimate object. Upon detection of the unique encrypted code by the receiver, and verification that the unique encrypted code is associated with the locator device and/or inanimate object by the locator device, the locator device may provide an indication of a location of the locator device and/or inanimate object.

In another aspect, a locating system for locating objects may include a hand-held communications device having a transmitter, such as a transceiver with a transmitter and receiver. The transmitter may be configured to transmit a unique encrypted code associated with an inanimate object in a frequency of less than the 2.4 GHz band, or a non-Wi-Fi and/or non-Bluetooth band, such that power of a battery associated with and powering the transmitter is conserved and the unique encrypted code travels approximately 100 feet or more. The unique encrypted code may be transmitted in the 900 MHz band. The locator system may include a receiver located on or within a locator device attached to the inanimate object. The receiver may be configured to detect the unique encrypted code and then the locator device (such as the receiver, a processor, or other component) may determine whether the unique encrypted code is associated with or corresponds to the locator device and/or inanimate object. The locator device and its components, such as the receiver, a processor, and an indicator, may be battery powered. Upon detection of the unique encrypted code by the receiver and verification that the unique encrypted code is associated with, or corresponds to, the locator device and/or inanimate object, the locator device may provide an indication of a location of the inanimate object.

In relation to FIG. 1, the locating system may include a mobile communications device 12, such as a cell phone, smart phone, or other hand-held communications device. The mobile communications device 12 may have a transmitter or transceiver 30. The locating system may include a locator device 22, such as a key chain, key fob, or other device. The locator device 22 may have a receiver 24, a processor or controller, and an indicator, such as an audible tone generator 14. The locating system, mobile communications device, and locator device may include additional, fewer, or alternate components.

The transceiver 30 on the mobile communications device 12 may be configured to transmit an encrypted or digital code associated with or corresponding to the locator device 22 and/or object, such as keys. The object may be attached to the locator device 22. The transceiver 30 may transmit the encrypted code in the 900 MHz band, and the transceiver may be powered by a first dedicated battery, such as a battery that powers the mobile communications device 12.

The locator device 22 attached to the object may include an indicator, such as a tone generator 14, in addition to the receiver 24. The receiver 24 may be configured to receive and/or detect the encrypted code transmitted in the 900 MHz band corresponding to and/or identifying the locator device 22 and/or object. Upon detection of the encrypted code, the locator device 22 may wake up from a sleep mode, decode the encrypted code, and then determine and/or verify whether the encrypted code received is actually associated with the locator device 22 and/or object. For instance, a processor associated with the receiver and/or locator device 22 may perform a comparison operation between the encrypted code that is received and decoded with a unique code identifying the locator device 22 that may be stored in a memory located in the processor and/or locator device 22.

The locator device 22 may be powered by a second dedicated battery. The battery of the locator device 22 may power the receiver 24, indicator, processor, and other components on the locator device 22, such as a speaker associated with the indicator. Upon receipt of the encrypted code by the receiver, and a decoding of the encrypted code and a determination/verification that the encrypted code is associated with the locator device and/or object by the locator device, the indicator on the locator device 24 may provide an indication as to a location of the locator device and/or object, such as an audible or visual indication.

In one embodiment, the method of transmitting and receiving may involve gating the transmitter of the transceiver 30 on the mobile communications device 12 and the receiver 24 on the locator device 22. The receiver 24 may be turned on for a fraction of a second and look for the transmitted signal sent from the transceiver 30, and then go back into sleep mode. The unwanted signals in the 900 MHz band transmitted from other devices may be ignored by the receiver 24 because it may be "on" for only a fraction of a second and designed to look for solely specific data sent from the transceiver 30.

As an example, the receiver 24 may turn on as soon as a user inserts batteries into the receiver 24. The receiver 24 may then turn on for a short period of time, such as 250 milleseconds in one embodiment. After which, the receiver 24 may go into sleep mode for a longer period time that is larger than the short period of time, such as 6.5 seconds in one embodiment. During the short period of time, such as the 250 millisecond time period, the receiver 24 may look for the transceiver 30 or a transmitter on the transceiver 30. If the receiver 24 locates the transmitter or a signal sent from the transmitter, the locator device 22 (or a processor on the locator device 22) and/or the receiver 24 may turn on a buzzer, light, or other position indicator.

The transmitter on the transceiver 30 may send multiple copies of a transmission within the short period of time that the receiver is "awake" and looking for the unique transmission, such as the 250 millisecond time period. The pattern at which the transmitter transmits the unique transmission may be 8 data bits spaced at a fixed interval. Other transceivers, receivers, transmission patterns, and time periods may be used.

III. Exemplary Method of Locating Objects

In general, a method of using a locating system to locate an inanimate object may be provided. The method may include receiving an encrypted code in the 900 MHz band via a receiver located on a locator device that is attached to the inanimate object; decoding the encrypted code in the 900 MHz band, and then determining whether the encrypted code in the 900 MHz band corresponds to a code identifying the locator device and/or inanimate object via the receiver or other component located on the locator device and/or inanimate object, such as a processor or controller; and providing an indication of a location of the locator device and/or inanimate object when the encrypted code in the 900 MHz band corresponds to the code identifying the locator device and/or inanimate object.

The indication of the inanimate object may be provided by one or more constant or flashing LEDs or other light, or by a speaker that provides an audible sound at approximately 85 dB, approximately 90 dB, approximately 95 dB or greater. The method may include transmitting the encrypted code in the 900 MHz band such that the encrypted code travels at least approximately 100 feet or more. The encrypted code may be transmitted via a dedicated transmitter/transceiver and/or antenna pair located on a hand-held communications device, and the encrypted code may be transmitted between approximately 900 MHz and approximately 950 MHz, such as at 910 MHz, 912 MHz, 915 MHz, 925 MHz, or other frequencies, including those discussed elsewhere herein.

Figure 2:
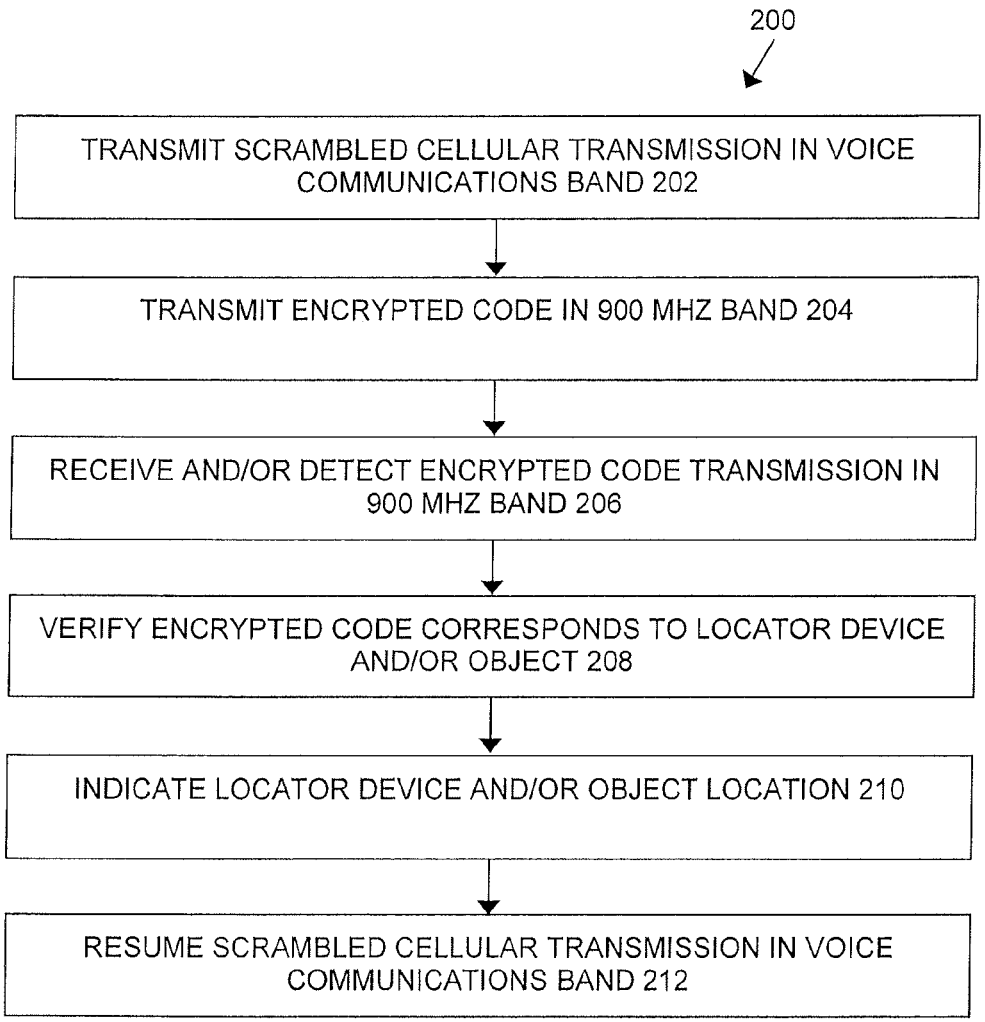
FIG. 2 depicts an exemplary method of locating an object via a locator device.

FIG. 2 depicts an exemplary method of locating an object 200. The method may include transmitting a scrambled voice cellular transmission 202, transmitting an encrypted code 204, receiving the encrypted code transmission 206, verifying the encrypted code corresponds to a locator device and/or object 208, indicating a locator device and/or object location 210, and resuming scrambled cellular transmissions 212. The method may include additional, fewer, or alternative steps.

The method may include transmitting a scrambled voice cellular transmission 202. The method may involve the use of a hand-held communications device in one embodiment, such as a cell or smart phone. The hand-held communications device may transmit a scrambled cellular transmission in a cellular telephone operating band, such as in the 800 MHz or 1900 MHz bands. The hand-held communications device may have a dedicated transmitter and/or antenna for transmitting scrambled voice transmissions in the cellular telephone operating band. The hand-held communications device may also be configured to operate in a Wi-Fi and/or Bluetooth bands. Other hand-held communications devices may be used.

The method may include transmitting an encrypted code 204 via a transmitter/transceiver. The encrypted code may be a digital or other code. The code may be a general code or be unique and correspond with a code identifying a locator device and/or object to be located. The transmitter may be a self-enclosed device, such as a device about the size of a SIM card or a credit card, or smaller. Alternatively or additionally, the transmitter may be affixed to the exterior of a hand-held communications device, or imbedded within the interior of a hand-held communications device. The transmitter may have a dedicated battery that powers the transmitter.

The transmitter may have a dedicated antenna, and be separate from the transmitter and/or antenna of a hand-held communications device used to transmit voice communications. Alternatively, a single transmitter and antenna pair may be used to transmit both the voice communications and the encrypted code.

The transmitter may transmit the encrypted code in a non-Wi-Fi and/or non-Bluetooth frequency. The transmitter may transmit the encrypted code at less than 2.4 GHz. Bluetooth and other frequencies, such as 2.4 GHz, may require substantial amounts of power to transmit and, as a result, cause the rapid depletion of battery power. Such frequencies may also have short effective ranges or lengths of travel for their transmissions.

In one aspect, a transmitter may transmit a dedicated search signal intended to locate an inanimate object. The transmitter may transmit a unique digital and/or encrypted code that is associated with a locator device and/or inanimate object attached to the locator device. The unique code may be transmitted in a frequency that preferably travels 100 feet or more. For instance, the unique code may be transmitted in the 900 MHz band or range, such as between approximately 900 MHz and approximately 950 MHz, between approximately 900 or 902 MHz and approximately 928 MHz, between approximately 900 MHz and approximately 925 MHz, between approximately 900 MHz and approximately 915 MHz, between approximately 900 MHz and approximately 912 MHz, between approximately 900 MHz and approximately 910 MHz, or within other ranges, such as ranges starting at 902 MHz or other frequencies. Specific frequencies may be used in some embodiments, such as 910 MHz, 912 MHz, or 915 MHz. In one embodiment, the unique code may be transmitted in a band between 880 MHz and 920 MHz. Other frequencies may be used.

The transmitter may be a miniaturized device affixed to a card or surface about the size of a credit card, SIM card, or even smaller. The transmitter may have an antenna that runs around the circumference of the card, or a portion thereof. If the transmitter is affixed to a card, the card may in turn be affixed to the exterior of a hand-held communications device, such as a cellular telephone, BlackBerry® device, PDA, or other digital device. The card may have a button or other means that triggers the sending of the encrypted code from the transmitter. In another embodiment, the transmitter may be embedded within the hand-held communications device.

The method may include receiving the encrypted code transmission 206. The locator device attached to the object to be located may have a receiver. Various receivers may be used and may include various filters, such as a low-pass, band-pass, hi-pass, and other type of filter. The filter may allow signals in a search frequency band to pass through and be detected and/or received by the locator device. The receiver may detect when a transmission is received in a search frequency band, such as in the 900 MHz band. The receiver may have components that then analyze the received encrypted code transmission, such as a processor or other circuitry.

The method may include verifying the encrypted code corresponds to the object to be located 208. The locator device may have components, such as the receiver, a processor, a comparator, and/or other circuitry, that may decode the encrypted code and then determine whether the encrypted code received and decoded corresponds to the locator device and/or object. Preferably, the encrypted code received is verified to correspond to the encrypted code associated with the locator device and/or object to prevent inadvertent audio, visual, or other indications of the position of the locator device and/or object. Alternatively, a general code may be transmitted in the 900 MHz band and, upon detection, the locator device may provide an indication of its position.

The method may include indicating a location of the locator device and/or object 210. The locator device may be battery powered. For instance, a battery may power an indicator, a receiver, a processor, a speaker, and/or other components located on the locator device. The indicator may provide an audible or visual indication to facilitate locating the locator device and/or inanimate object when lost. The audible indication may be a tone, chirping, voice, or other sound. The audible indication may be reproduced at a high enough dB level such that the audible indication may be heard by a human ear at a distance of approximately 20 feet, approximately 30 feet, approximately 40 feet, approximately 50 feet, approximately 60 feet, approximately 70 feet, or more. The dB level of the audible indication may be approximately 85 dB or more. The visual indication may be one or more light emitting diodes (LEDs) or other lights flashing. Other indications may be used.

The method may include resuming scrambled cellular transmissions 212. In an embodiment in which the transmitter is embedded within a hand-held communications device, once the encrypted code is transmitted, the hand-held communications device may then switch back to normal voice or cellular transmissions. For instance, the hand-held communications device may use a single transmitter for both scrambled voice communications and encrypted code transmissions. Alternatively, two transmitters may be used for voice and encrypted code transmissions, respectively. If two transmitters are used, each transmitter may have a dedicated antenna, or both transmitters may use the same antenna.

The embodiments disclosed herein may have other applications as well. For instance, transmissions within a 900 MHz band, such as the bands disclosed herein, may be used for garage door openers, remote device and equipment operation (such as turning on and off lighting, motors, pumps, heating and cooling equipment, watering and irrigation equipment, and other equipment), remote opening and/or locking of vehicle doors, remote starting and/or turning off of vehicles, and other applications.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A locating system for locating an object, the locating system comprising:
a communications device comprising a first dedicated transmitter and antenna pair configured to transmit, in an encrypted mode, an encrypted code associated with a locator device and/or object, the transmitter transmitting the encrypted code in the 900 MHz band, the transmitter being powered by a first battery; and
the locator device being attached to the object, the locator device having a receiver and an indicator, the receiver being configured to receive the encrypted code transmitted in the 900 MHz band and then the locator device determines whether the encrypted code is associated with the locator device and/or object, the locator device being powered by a second battery,
wherein upon receipt of the encrypted code by the receiver and a determination that the encrypted code is associated with the locator device and/or object by the locator device, the indicator on the locator device provides an indication as to a location of the locator device and/or object,
wherein the communications device is configured to transmit in both a scrambled communications mode operating in a 800 MHz band and the encrypted mode in which the encrypted code is transmitted in the 900 MHz band, and wherein the 900 MHz band is between approximately 900 MHz and approximately 950 MHz.

2. The locating system of claim 1, wherein an effective range that the transmitter can trigger the indicator on the locator device into indicating the location of the locator device and/or object is at least approximately 100 feet or more.

3. The locating system of claim 2, wherein the indication as to the location of the locator device and/or object is an audible sound, and a decibel level of the audible sound is approximately 85 dB or greater.

4. The locating system of claim 1, wherein the transmitter can trigger the indicator on the locator device even if a line of sight between the transmitter and the locator device is blocked.

5. The locating system of claim 1, wherein the transmitter is located upon a flat surface having a surface area smaller than approximately 1.0 square inch.

6. The locating system of claim 5, wherein the transmitter has an antenna that is wrapped around at least a portion of the circumference of the flat surface on which the transmitter is located.

7. The locating system of claim 1, wherein the transmitter is attached to an exterior, or located within an interior, of the communications device, and transmits the encrypted code upon user activation of a button or icon.

8. A locating system for locating an inanimate object, the locating system comprising:
a communications device configured to transmit, in an encrypted mode, a unique encrypted code associated with a locator device and/or inanimate object, wherein the communications device comprises a first dedicated transmitter and antenna pair configured to transmit, in the encrypted mode, the unique encrypted code associated with the locator device and/or inanimate object; and
the locator device having a receiver and an indicator, the locator device being attached to the inanimate object, the receiver being configured to detect the unique encrypted code and then the receiver or another component of the locator device determines whether the unique encrypted code detected is associated with the locator device and/or inanimate object,
wherein the communications device transmits the unique encrypted code in a 900 MHz band, and upon detection of the unique encrypted code by the receiver and verification that the unique encrypted code is associated with the locator device and/or inanimate object by the locator device, the indicator of the locator device provides an indication of a location of the locator device and/or inanimate object, and
wherein a scrambled mode of the communications device operates in a 800 MHz band, and the 900 MHz band of the encrypted mode for transmitting the unique encrypted code operates between approximately 900 MHz and approximately 925 MHz.

9. The locating system of claim 8, wherein the indication of the location of the locator device and/or inanimate object is an audible sound generated by the indicator, wherein a decibel level of the audible sound is approximately 85 dB or greater.

10. The locating system of claim 8, wherein the indication of the location of the locator device and/or inanimate object generated by the indicator is a visual indication.

11. The locating system of claim 8, wherein the transmitter can trigger the indicator on the locator device into indicating the position of the locator device and/or inanimate object even if a line of sight of between the transmitter and the locator device is blocked.

12. The locating system of claim 8, wherein the locator device is configured to normally operate in sleep mode to conserve power of a battery powering the indicator and/or other components located on the locator device.

13. A method of using a locating system to locate an inanimate object, the method comprising:
receiving an encrypted code in the 900 MHz band via a receiver located on a locator device, the locator device being attached to the inanimate object, wherein the encrypted code is received from a communications device comprising a first dedicated transmitter and antenna pair that is configured to transmit, in an encrypted mode, the encrypted code, and wherein a scrambled mode of the communications device operates in a 800 MHz band, and the 900 MHz band of the encrypted mode for transmitting the unique encrypted code operates between approximately 900 MHz and approximately 950 MHz;

determining whether the encrypted code in the 900 MHz band corresponds to a code identifying the locator device and/or inanimate object via a processor located on the locator device; and providing an indication of a location of the locator device and/or inanimate object via the locator device when the encrypted code in the 900 MHz band corresponds to the code identifying the locator device and/or inanimate object.

14. The method of using the locating system of claim 13, wherein the indication of the inanimate object is provided by a speaker located on the locator device, the speaker providing an audible sound at approximately 85 dB or greater.

15. The method of using the locating system of claim 13, the method further comprising transmitting the encrypted code in the 900 MHz band such that the encrypted code is capable of travelling at least approximately 100 feet or more.

* * * * *